US012730528B2

(12) United States Patent
Fletcher

(10) Patent No.: US 12,730,528 B2
(45) Date of Patent: Sep. 8, 2026

(54) COMPUTER CURSOR MOVING DEVICE

(71) Applicant: Rex Fletcher, Houston, TX (US)

(72) Inventor: Rex Fletcher, Houston, TX (US)

( * ) Notice: Subject to any disclaimer, the term of this patent is extended or adjusted under 35 U.S.C. 154(b) by 0 days.

(21) Appl. No.: 18/915,795

(22) Filed: Oct. 15, 2024

(65) Prior Publication Data

US 2026/0104767 A1 Apr. 16, 2026

(51) Int. Cl.
*G06F 3/039* (2013.01)

(52) U.S. Cl.
CPC .................................... *G06F 3/039* (2013.01)

(58) Field of Classification Search
CPC ...... G06F 3/03543; G06F 3/039; G06F 3/033; G06F 3/03549; G06F 3/0213
See application file for complete search history.

(56) References Cited

U.S. PATENT DOCUMENTS 2,402,463 A 6/1946 Sullivan
D990,474 S 6/2023 Wang
11,762,488 B1 9/2023 Korol
11,789,875 B1 10/2023 Spinola
12,229,347 B1 * 2/2025 Korol ........................ G06F 3/03
12,306,687 B2 * 5/2025 Reddy .................. G06F 9/4418
2012/0287047 A1 11/2012 White
2018/0067568 A1 * 3/2018 Beck ..................... G06F 3/0383
2018/0149302 A1 * 5/2018 Papapanos ........... F16M 13/022
2021/0268648 A1 * 9/2021 Park ..................... B25J 15/0066
2021/0367488 A1 * 11/2021 Vollmar ................. B23K 26/21

FOREIGN PATENT DOCUMENTS

JP 2021179817 A * 11/2021
WO WO2019112583 6/2019

* cited by examiner

*Primary Examiner* — Scott D Au

(57) ABSTRACT

A computer cursor moving device includes a housing, a motor positioned in the housing, a power button, an arm, and a contact structure. The power button is positioned at an outer surface of the housing and connected to the motor to permit selective activation of the motor. The arm is connected to the motor and projecting out through an aperture in the housing. The motor is designed to move the arm in a reciprocating manner. The contact structure is connected to a distal end of the arm. The contact structure is designed to engage a computer manual input device designed to cause movement of a cursor on a computer screen such that, upon reciprocating movement of the arm, the contact structure causes the computer manual input device to move the cursor.

14 Claims, 10 Drawing Sheets

10
54
30
32
34
20
28
20
34
32
54
46
12
16
22
38
24
18

18
36
34
32

COMPUTER CURSOR MOVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to computer mice and stylus devices and more particularly pertains to a new computer cursor moving device for automatically engaging a computer manual input device, such as a touchpad or mouse, designed to cause movement of a cursor on a computer screen, to thereby prevent a computer from going into standby or sleep mode with the computer screen or hard drive off, as well as provide the impression of a person engaging the computer.

(2) Description of Related Art Including Information Disclosed Under 37 CFR 1.97 and 1.98

The prior art relates to computer mice and stylus devices, as well as automated devices to move a structure for engaging a computer input device. However, most are quite complex and are not able to engage more than one type of computer input device. The prior art, as best understood, does not disclose a computer cursor moving device that includes a motor designed to move an arm in a reciprocating manner with a contact structure connected to a distal end of the arm, which contact structure is designed to engage a computer manual input device such that, upon reciprocating movement of the arm, the contact structure causes the computer manual input device to move the cursor. In addition, the contact structure can be a stylus or a clasp for engaging a mouse, which are interchangeable.

BRIEF SUMMARY OF THE INVENTION

An embodiment of the disclosure meets the needs presented above in a computer cursor moving device generally comprising a housing, a motor positioned in the housing, a power button, an arm, and a contact structure. The power button is positioned at an outer surface of the housing and connected to the motor to permit selective activation of the motor. The arm is connected to the motor and projecting out through an aperture in the housing. The motor is designed to move the arm in a reciprocating manner. The contact structure is connected to a distal end of the arm. The contact structure is designed to engage a computer manual input device designed to cause movement of a cursor on a computer screen such that, upon reciprocating movement of the arm, the contact structure causes the computer manual input device to move the cursor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
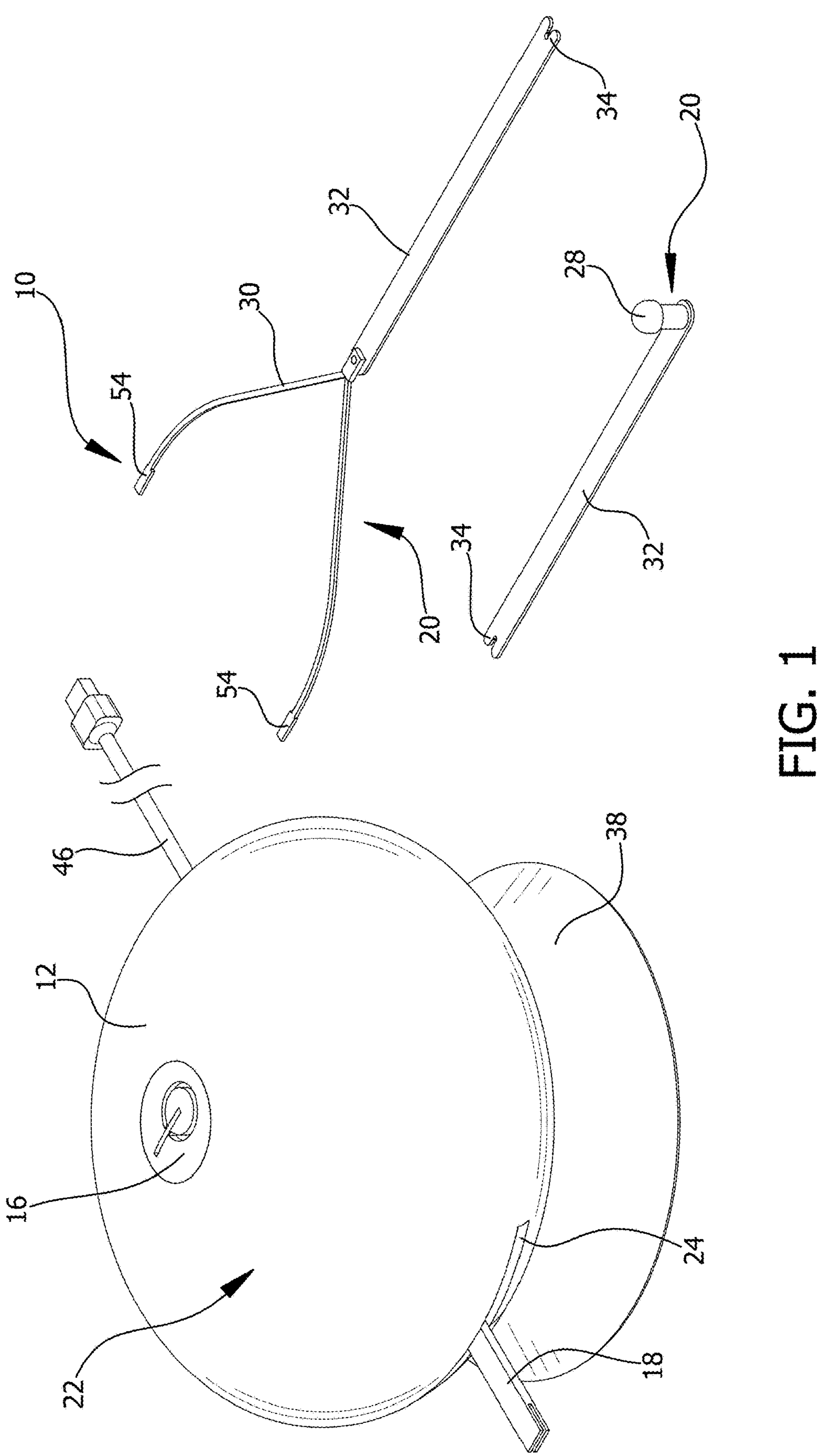
FIG. 1 is a perspective view of a computer cursor moving device according to an embodiment of the disclosure.
Figure 2:
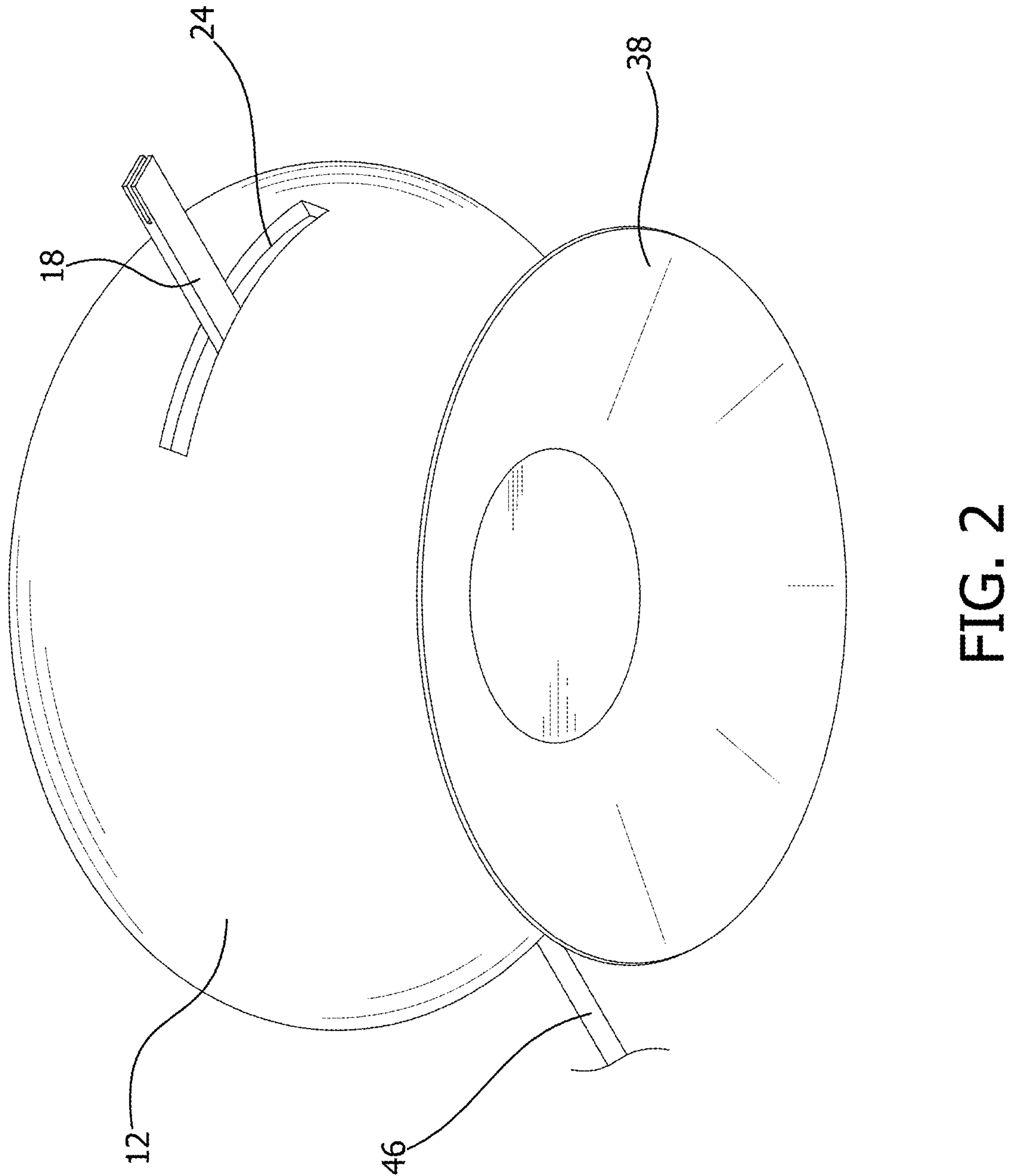
FIG. 2 is a bottom perspective view of an embodiment of the disclosure.
Figure 3:
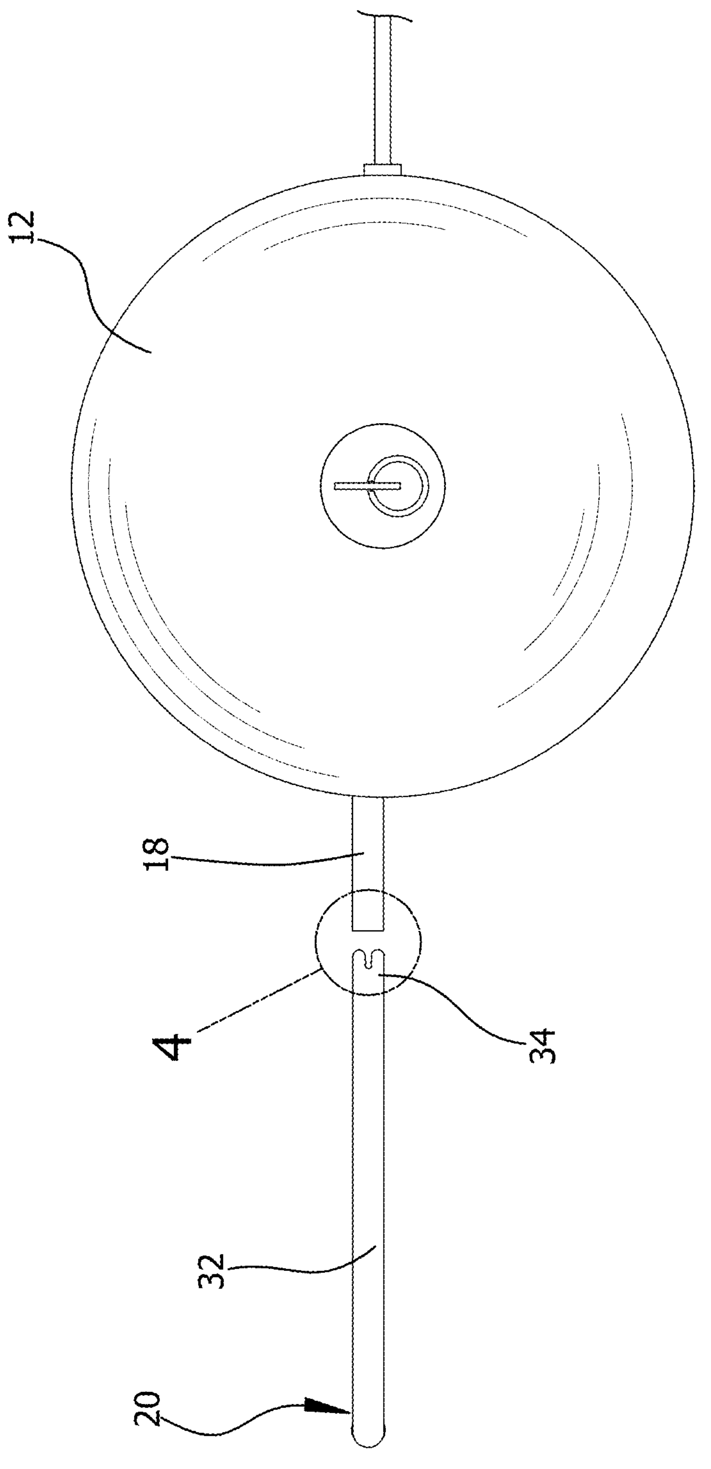
FIG. 3 is a top view of an embodiment of the disclosure.
Figure 4:
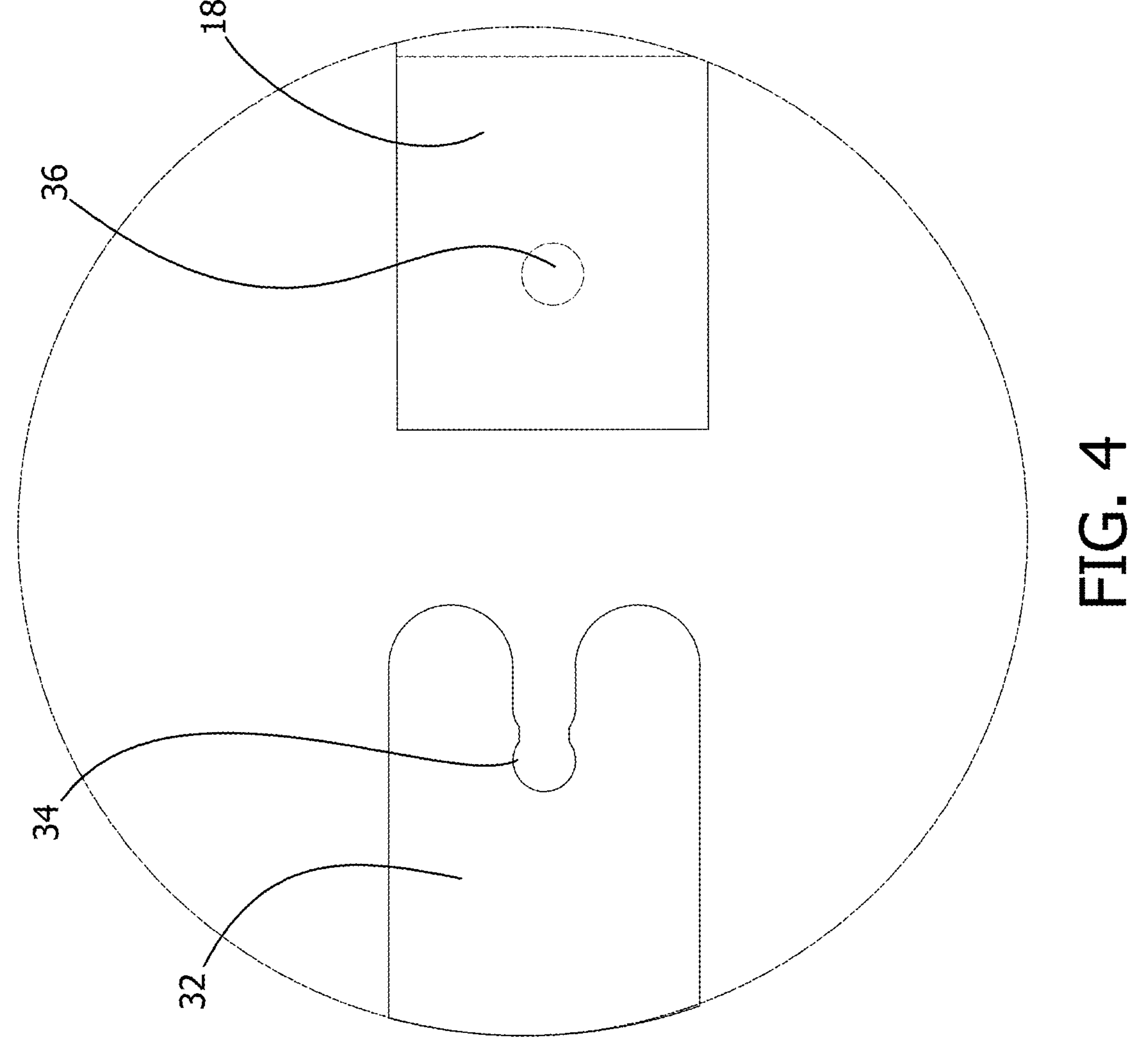
FIG. 4 is a close-up view of a portion of the embodiment of the disclosure in FIG. 3.

With reference now to the drawings, and in particular to FIGS. 1 through 10 thereof, a new computer cursor moving device embodying the principles and concepts of an embodiment of the disclosure and generally designated by the reference numeral 10 will be described.

As best illustrated in FIGS. 1 through 10, the computer cursor moving device 10 generally comprises A computer cursor moving device 10 includes a housing 12, a motor 14 positioned in the housing 12, a power button 16, an arm 18, and a contact structure 20. The power button 16 is positioned at an outer surface 22 of the housing 12 and connected to the motor 14 to permit selective activation of the motor 14. The arm 18 is connected to the motor 14 and projects out through an aperture 24 in the housing 12. The motor 14 is designed to move the arm 18 in a reciprocating manner. The contact structure 20 is connected to a distal end 26 of the arm 18. The contact structure 20 is designed to engage a computer manual input device designed to cause movement of a cursor on a computer screen such that, upon reciprocating movement of the arm 18, the contact structure 20 causes the computer manual input device to move the cursor.

Figure 7:
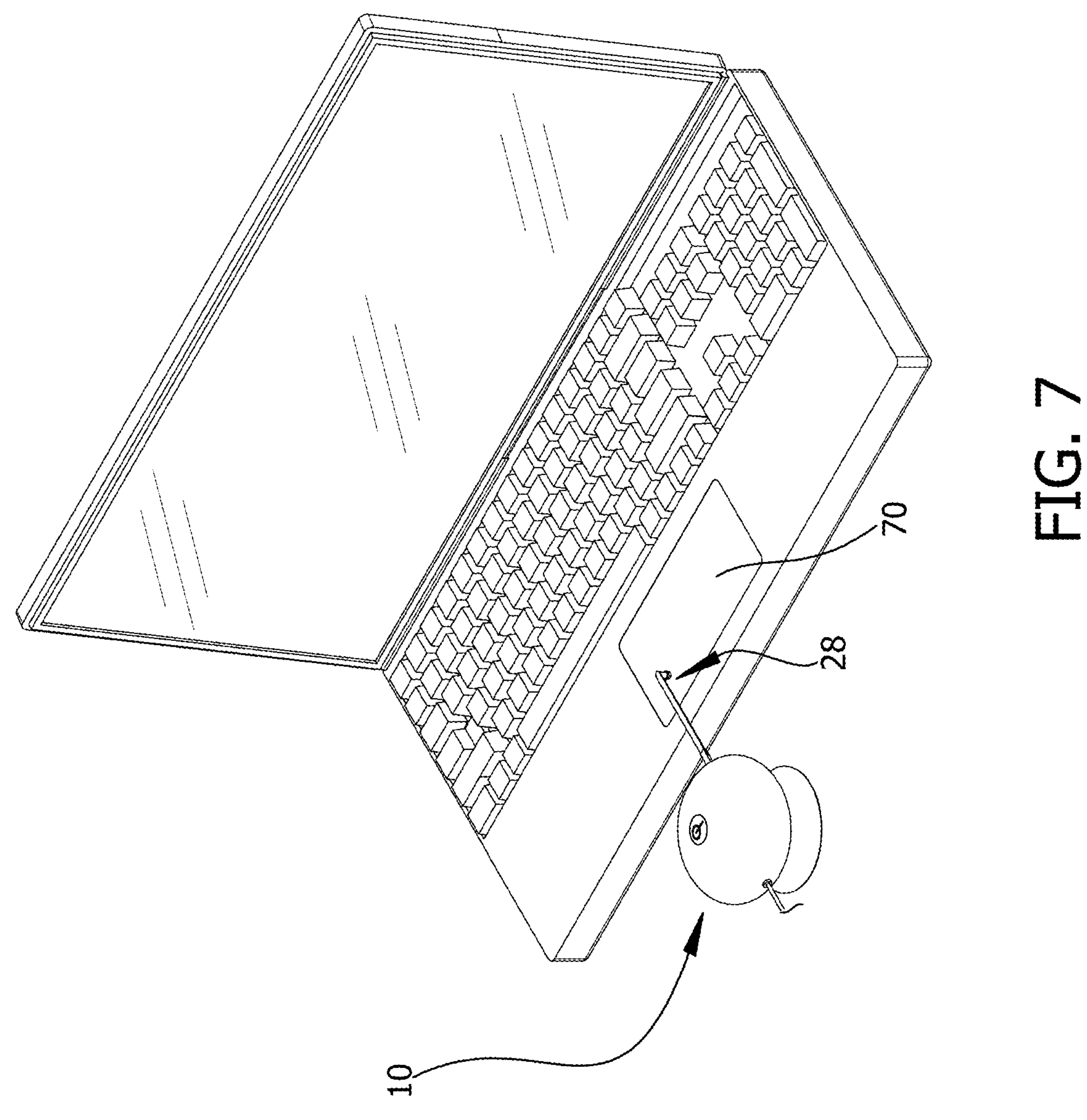
FIG. 7 is a perspective view of an embodiment of the disclosure in use.
Figure 8:
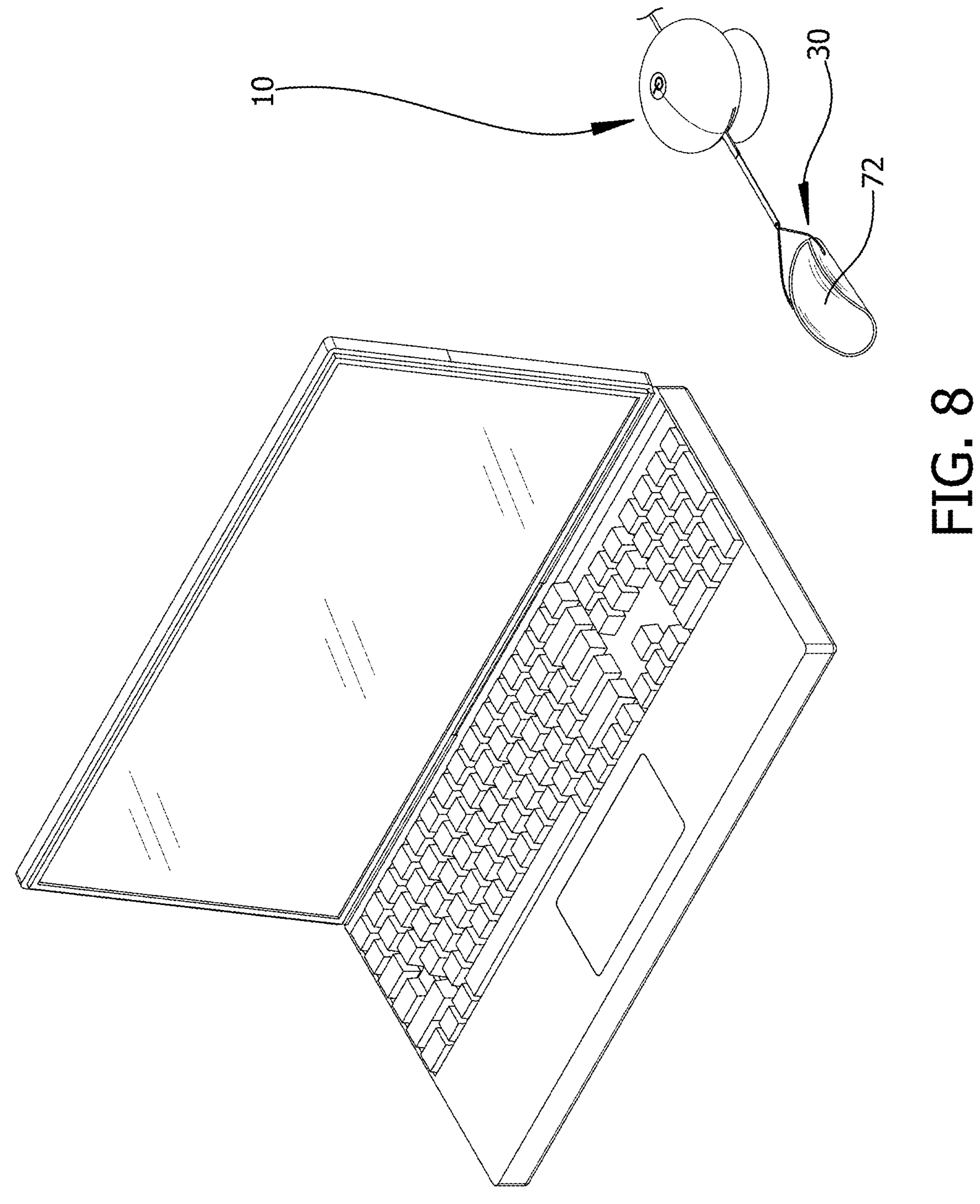
FIG. 8 is a perspective view of an embodiment of the disclosure in use.

As shown in FIG. 1, the contact structure 20 is a stylus 28 extending perpendicularly from the arm 18. The stylus 28 is designed to engage a computer touchpad 70, as shown in FIG. 7. Alternatively, as shown in FIG. 1, the contact structure 20 is a clasp 30 extending parallel from the arm 18. The clasp 30 is designed to hold a computer mouse 72, as shown in FIG. 8. The clasp 30 is Y-shaped or in the shape of a wishbone with two gripping surfaces 54 that engage on either side of the mouse 72, though other gripping designs or styles are within the scope of the disclosure. In the exemplary embodiment shown in FIGS. 3 and 4, the contact structure 20 is detachably connected to the arm 18 to permit interchanging of the contact structure 20 with another contact structure 20, such as the clasp 30 for the stylus 28 and vice versa. This is accomplished by a bar 32 attached to the contact structure 20, which bar 32 includes a clamp 34 that engages a projection 36 on the arm 18 via a snap fit, though essentially any type of detachable connection, such as buttons or hook and loop fasteners, are within the scope of the disclosure. The clasp 30 is therefore interchangeable with the stylus 28 and vice versa, possibly as part of an overall assembly or kit. In another possible embodiment, the contact structure 20 is not detachably connected to the arm 18, such that the computer cursor moving device 10 only has one type of contact structure 20. However, the interchangeability provides the user with the ability to engage different types of computers with one device.

In the exemplary embodiment, a suction cup 38 is positioned on a bottom surface of the housing 12 to secure the housing 12 to a surface adjacent a computer, though other structures, such as a weighted structure, are within the scope of the disclosure.

Figure 9:
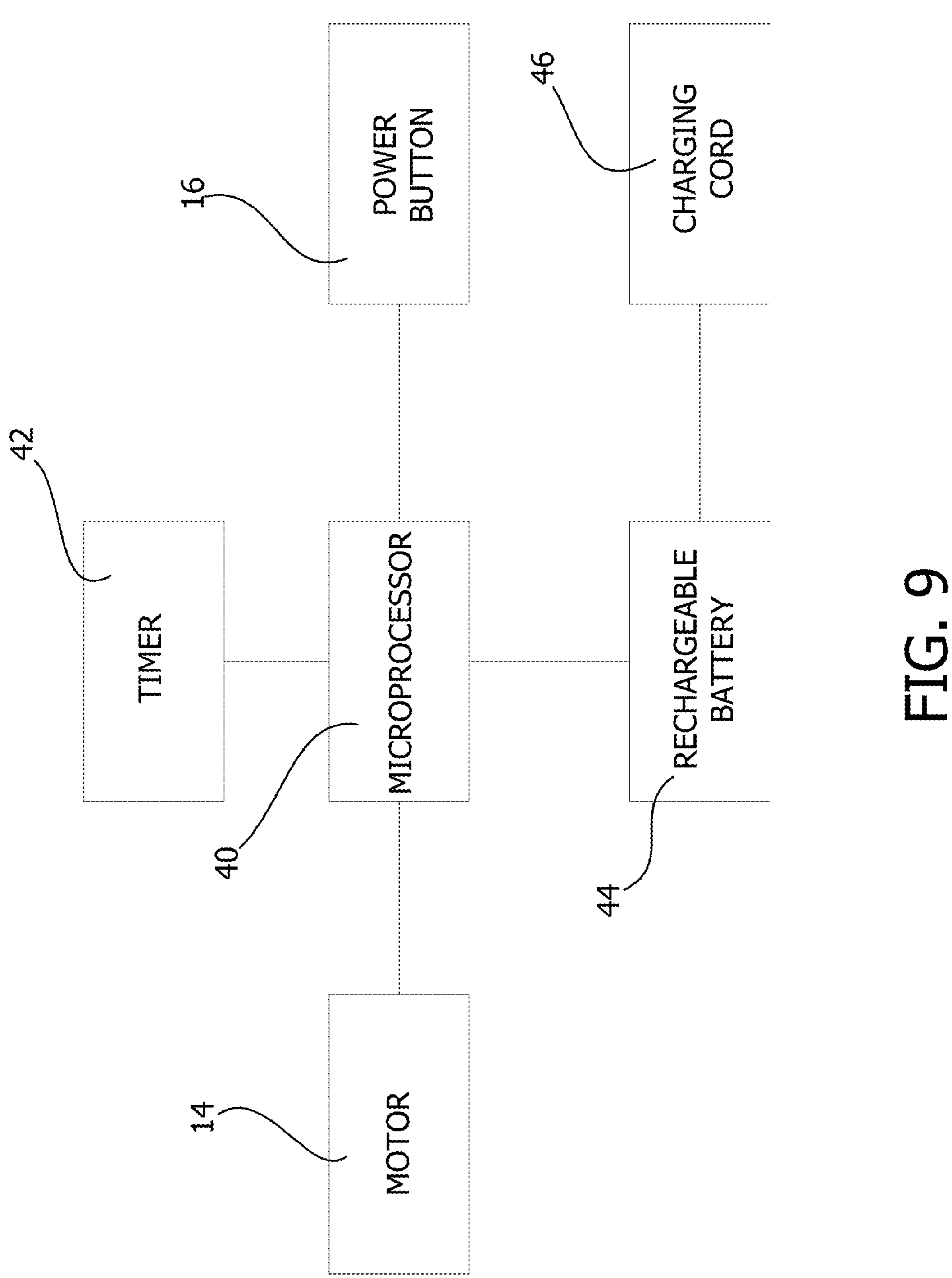
FIG. 9 is a block diagram of components of an embodiment of the disclosure.
Figure 10:
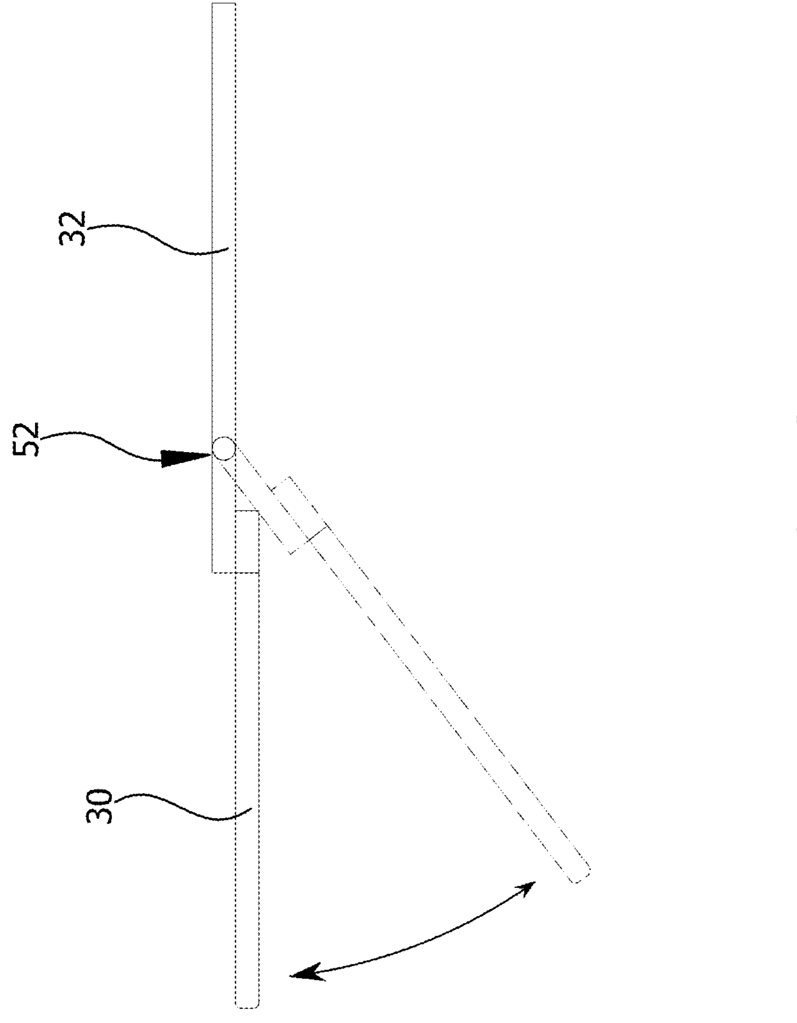
FIG. 10 is a side view of an embodiment of the disclosure.

As shown in FIG. 9, a microprocessor 40 is connected to the motor 14 to control operation thereof. A timer 42 is connected to the microprocessor 40 to turn off the motor 14 after a set period of time. The computer cursor moving device 10 could be designed to only run for a pre-programmed period of time, or could be designed to allow a user to select a desired period of operating time. A rechargeable battery 44 is connected to the motor 14, the microprocessor 40, and the timer 42, which battery 44 could be recharged by a charging cord 46. Alternatively, the battery 44 could not be rechargeable but could be hardwired to the charging cord 46 and only operable when plugged into a wall outlet.

In the exemplary embodiment, the motor 14 includes a disc-shaped portion 48 connected to the arm 18 to permit reciprocating movement of the contact structure 20 along a substantially circular path. In the exemplary embodiment shown in FIG. 6, an additional stabilizer wheel 50 is connected to the arm 18, though other reciprocating designs are within the scope of the disclosure. The aperture 24 is in the form of an elongated slot to permit movement of the arm 18. In one possible embodiment shown in FIG. 10, clasp 30 could be pivotably connected by a hinge 52 or similar structure to permit adjustment of the height of the clasp 30. This design could also be applicable to the stylus 28 for height adjustment. In another possible embodiment, the bar 32 or the arm 18 could be made of a resiliently flexible material, both for height adjustment and to ensure, in the case of the stylus 28, constant pressure on a computer touchpad 70.

Figure 5:
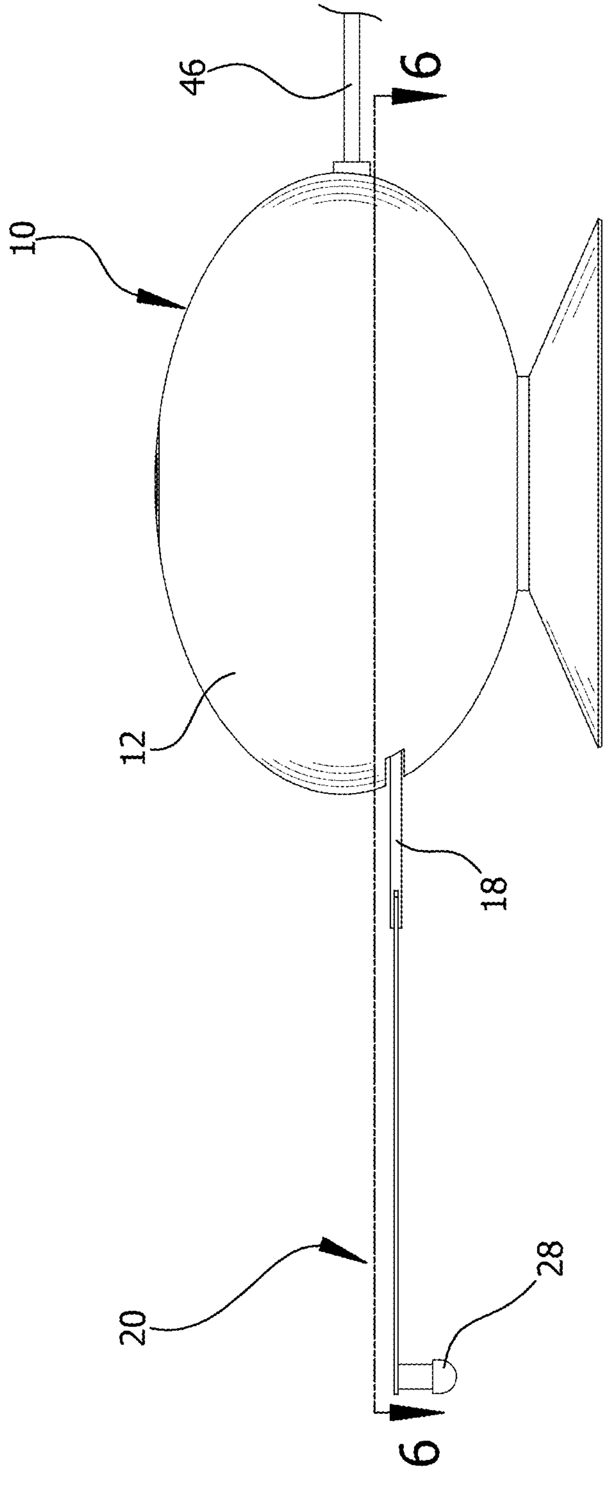
FIG. 5 is a side view of an embodiment of the disclosure.
Figure 6:
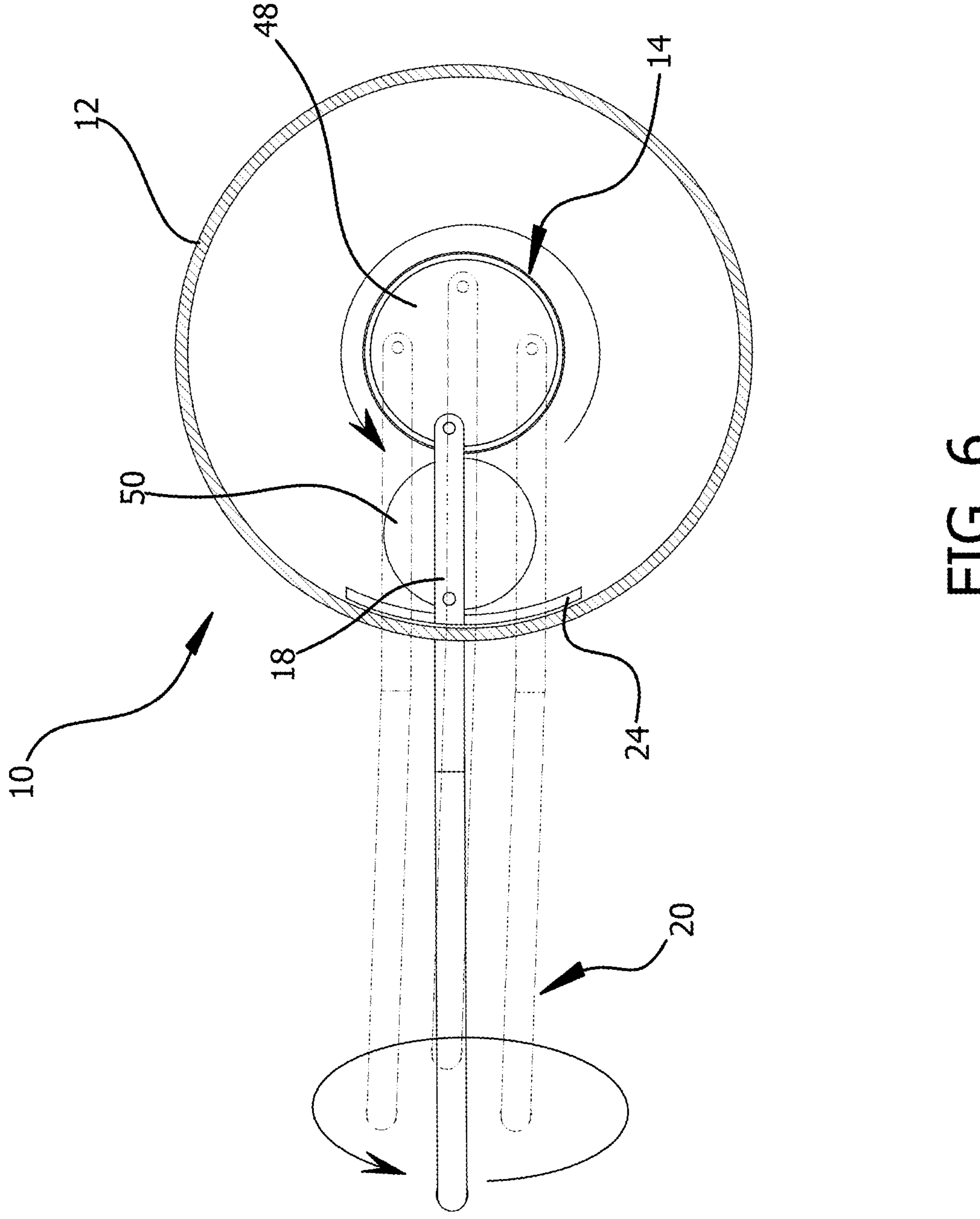
FIG. 6 is a cross-sectional view of the embodiment of the disclosure in FIG. 5.

As best seen in FIG. 5, the housing 12 has a partially flattened, spherical shape, though essentially any shape, such as spherical or rectangular, is within the scope of the disclosure.

FIGS. 7 and 8 show the use of the computer cursor moving device 10. A user first places the stylus 28 on a touchpad 70 or places the clasp 30 on a computer mouse 72, as the case may be. The user then powers on the computer cursor moving device 10 and the motor 14 moves the arm 18 in a reciprocating movement. The motor 14 moves the arm 18 indefinitely until manually powered off, or according to a setting of the timer 42. If possible and desired, the user can swap the stylus 28 for the clasp 30, or vice versa, for use with a different computer.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A computer cursor moving device comprising:

a housing;

a motor being disposed in said housing;

a power button being disposed at an outer surface of said housing and connected to said motor to permit selective activation of said motor;

an arm being connected to said motor and projecting out through an aperture in said housing, said motor being configured to move said arm in a reciprocating manner;

a contact structure being connected to a distal end of said arm, said contact structure being configured to engage a computer manual input device designed to cause movement of a cursor on a computer screen such that, upon reciprocating movement of said arm, said contact structure causes the computer manual input device to move the cursor; and wherein said contact structure is detachably connected to said arm to permit interchanging of said contact structure with another contact structure.

2. The computer cursor moving device of claim 1, wherein said contact structure is a stylus extending perpendicularly from said arm, said stylus being configured to engage a computer touchpad.

3. The computer cursor moving device of claim 1, wherein said contact structure is a clasp extending parallel from said arm, said clasp being configured to hold a computer mouse.

4. The computer cursor moving device of claim 1, wherein said motor includes a disc-shaped portion connected to said arm to permit reciprocating movement of said contact structure along a substantially circular path.

5. The computer cursor moving device of claim 1, wherein the computer cursor moving device further comprises a suction cup being disposed on a bottom surface of said housing to secure said housing to a surface adjacent a computer.

6. The computer cursor moving device of claim 1, wherein said housing has a partially flattened, spherical shape.

7. The computer cursor moving device of claim 1, wherein the computer cursor moving device further comprises:

a microprocessor connected to said motor to control operation thereof; and a timer connected to said microprocessor to turn off said motor after a set period of time.

8. The computer cursor moving device of claim 1, wherein the computer cursor moving device further comprises a rechargeable battery connected to said motor.

9. A computer cursor moving device comprising:

a housing;

a suction cup being disposed on a bottom surface of said housing to secure said housing to a surface adjacent a computer;

a motor being disposed in said housing;

a power button being disposed at an outer surface of said housing and connected to said motor to permit selective activation of said motor;

a microprocessor being connected to said motor to control operation thereof;

a timer being connected to said microprocessor to turn off said motor after a set period of time;

a rechargeable battery being connected to said motor, said microprocessor, and said timer;

an arm being connected to said motor and projecting out through an aperture in said housing, said motor being configured to move said arm in a reciprocating manner;

a contact structure being connected to a distal end of said arm, said contact structure being configured to engage a computer manual input device designed to cause movement of a cursor on a computer screen such that, upon reciprocating movement of said arm, said contact structure causes the computer manual input device to move the cursor;

wherein said contact structure is detachably connected to said arm to permit interchanging of said contact structure with another contact structure;

wherein said motor includes a disc-shaped portion connected to said arm to permit reciprocating movement of said contact structure along a substantially circular path; and wherein said housing has a partially flattened, spherical shape.

10. The computer cursor moving device of claim 9, wherein said contact structure is a stylus extending perpendicularly from said arm, said stylus being configured to engage a computer touchpad.

11. The computer cursor moving device of claim 9, wherein said contact structure is a clasp extending parallel from said arm, said clasp being configured to hold a computer mouse.

12. A computer cursor moving device assembly comprising:

a housing;

a motor being disposed in said housing;

a power button being disposed at an outer surface of said housing and connected to said motor to permit selective activation of said motor;

an arm being connected to said motor and projecting out through an aperture in said housing, said motor being configured to move said arm in a reciprocating manner;

a stylus being detachably connected at a distal end of said arm, said stylus being configured to engage a computer touchpad such that, upon reciprocating movement of said arm, said stylus causes the computer touchpad to move the cursor; and a clasp being configured to be detachably connected at said distal end of said arm, said clasp being configured to hold a computer mouse such that, upon reciprocating movement of said arm, said clasp moves the computer mouse to move the cursor, wherein said clasp is interchangeable with said stylus and vice versa.

13. The computer cursor moving device assembly of claim 12, further comprising:

a suction cup being disposed on a bottom surface of said housing to secure said housing to a surface adjacent a computer;

a microprocessor connected to said motor to control operation thereof;

a timer connected to said microprocessor to turn off said motor after a set period of time; and a rechargeable battery connected to said motor.

14. The computer cursor moving device assembly of claim 13, wherein:

said motor includes a disc-shaped portion connected to said arm to permit reciprocating movement of said contact structure along a substantially circular path; and said housing has a partially flattened, spherical shape.

* * * * *